(12) United States Patent
Jia et al.

(10) Patent No.: US 10,399,286 B2
(45) Date of Patent: Sep. 3, 2019

(54) COMPOSITE MATERIAL PACKAGED FIBER GRATING SENSOR AND MANUFACTURING METHOD THEREOF

(71) Applicants: SHANDONG UNIVERSITY, Jinan, Shandong (CN); CHANGCHUN INSTITUTE OF APPLIED CHEMISTRY, CHINESE ACADEMY OF SCIENCES, Changchun, Jilin (CN); JILIN CORE LOGISTICS AND COATING EQUIPMENT CO., LTD., Changchun, Jilin (CN); SHANDONG GELNNT ENVIRONMENTAL TECHONOLOGY CO., LTD., Dezhou, Shandong (CN)

(72) Inventors: Yuxi Jia, Jinan (CN); Yunli Guo, Jinan (CN); Lijia An, Changchun (CN); Weiguo Yao, Changchun (CN); Linlin Gao, Jinan (CN); Qinglin Wang, Jinan (CN); Mingshun Jiang, Jinan (CN); Haiqing Wang, Jinan (CN); Jieying Zhi, Jinan (CN); Yaru Zhao, Jinan (CN); Qingmei Sui, Jinan (CN)

(73) Assignees: SHANDONG UNIVERSITY, Jinan (CN); CHANGCHUN INSTITUTE OF APPLIED CHEMISTRY, CHINESE ACADEMY OF SCIENCES, Changchun (CN); JILIN CORE LOGISTICS AND COATING EQUIPMENT CO., LTD., Changchun (CN); SHANDONG GELNNT ENVIRONMENTAL TECHNOLOGY CO., LTD., Dezhou (CN)

( * ) Notice: Subject to any disclaimer, the term of this patent is extended or adjusted under 35 U.S.C. 154(b) by 0 days.

(21) Appl. No.: 16/066,146

(22) PCT Filed: Sep. 28, 2017

(86) PCT No.: PCT/CN2017/103873
§ 371 (c)(1),
(2) Date: Jun. 26, 2018

(87) PCT Pub. No.: WO2018/064949
PCT Pub. Date: Apr. 12, 2018

(65) Prior Publication Data
US 2019/0016065 A1 Jan. 17, 2019

(30) Foreign Application Priority Data
Oct. 9, 2016 (CN) .......................... 2016 1 0880225

(51) Int. Cl.
*G02B 6/02* (2006.01)
*B29C 70/34* (2006.01)
(Continued)

(52) U.S. Cl.
CPC ............ *B29C 70/34* (2013.01); *B29C 70/443* (2013.01); *B29C 70/88* (2013.01);
(Continued)

(58) Field of Classification Search
CPC .......... G02B 6/02057; G01D 5/35316; G01K 11/3206
See application file for complete search history.

(56) References Cited

U.S. PATENT DOCUMENTS 5,828,059 A * 10/1998 Udd ................. G01L 1/246
250/227.18
6,420,696 B1 * 7/2002 Bennett ............ G01D 5/35341
250/227.14
(Continued)

FOREIGN PATENT DOCUMENTS

| CN | 1202964 A | 12/1998 |
| CN | 1733645 A | 2/2006 |

(Continued)

OTHER PUBLICATIONS

Nov. 9, 2017 Written Opinion of the International Searching Authority issued in International Patent Application No. PCT/CN2017/103873.

(Continued)

*Primary Examiner* — Charlie Y Peng

(74) *Attorney, Agent, or Firm* — Oliff PLC

(57) ABSTRACT

A composite material packaged fiber grating sensor and a manufacturing method thereof. The sensor includes a fiber grating sensor component, a composite material coverage layer, a resin package layer and a composite material substrate layer. In the sensor, a temperature fiber grating and a strain fiber grating are packaged in a composite material structure, so that the structure is light and simple, its computability with the composite material is good, the measurement accuracy is high, and the survival rate and the service life of the installed sensor can be greatly improved, the sensor component can be externally pasted on to or inter-implanted in a composite material structural part, and can be applied to the distributed online health monitoring on the structural part. The manufacturing method of the composite material packaged fiber grating sensor is simple, efficient and stable, and is suitable for rapid mass production by enterprises.

15 Claims, 3 Drawing Sheets

(51) Int. Cl.

| | |
|---|---|
| *B29C 70/44* | (2006.01) |
| *G01K 11/32* | (2006.01) |
| *G01D 21/02* | (2006.01) |
| *G01L 1/24* | (2006.01) |
| *B29C 70/88* | (2006.01) |
| *G01D 5/353* | (2006.01) |
| *B29C 70/54* | (2006.01) |

(52) U.S. Cl.
CPC ......... *G01D 5/35316* (2013.01); *G01D 21/02* (2013.01); *G01K 11/32* (2013.01); *G01K 11/3206* (2013.01); *G01L 1/246* (2013.01); *G02B 6/02057* (2013.01); *B29C 70/54* (2013.01); *B32B 2260/023* (2013.01); *B32B 2260/046* (2013.01); *B32B 2262/101* (2013.01)

(56) References Cited

U.S. PATENT DOCUMENTS

| | | | |
|---|---|---|---|
| 8,327,716 B2* | 12/2012 | Kreuzer | ............... G01B 11/165 |
| | | | 73/800 |
| 10,145,786 B2* | 12/2018 | Saito | .................. G01D 5/35351 |
| 2005/0236559 A1 | 10/2005 | Calvert et al. | |

FOREIGN PATENT DOCUMENTS

| | | |
|---|---|---|
| CN | 101570065 A | 11/2009 |
| CN | 101571491 A | 11/2009 |
| CN | 201429721 Y | 3/2010 |
| CN | 102445435 A | 5/2012 |
| CN | 203786406 U | 8/2014 |
| CN | 104385627 A | 3/2015 |
| CN | 104677928 A | 6/2015 |
| CN | 105115439 A | 12/2015 |
| CN | 105371880 A | 3/2016 |
| CN | 106404065 A | 2/2017 |
| JP | 2006-047154 A | 2/2006 |

OTHER PUBLICATIONS

Wang, "Design Theory and Application Technology of Composite Materials FBG Sensor", May 2008.

Grabovac, "Packaging and Mounting of In-Fibre Bragg Grating Arrays for Structural Health Monitoring of Large Structures", Oct. 2010.

Nov. 9, 2017 International Search Report issued in International Patent Application No. PCT/CN2017/103873.

* cited by examiner

COMPOSITE MATERIAL PACKAGED FIBER GRATING SENSOR AND MANUFACTURING METHOD THEREOF

FIELD OF THE INVENTION

The present invention relates to a composite material packaged fiber grating sensor and a manufacturing method thereof.

BACKGROUND OF THE INVENTION

Large-scale structural parts, such as bridges, ships, high-speed rails, wind turbine blades, aircraft wings, are subjected to effects of adverse factors such as vibration, corrosion, hygrothermal aging, harsh environments and the like in long-term use, thus inevitably resulting in fatigue and damage accumulation; and in addition, some unexpected events, such as heavy collisions, flying stone and hail impacts, lightning strikes and the like would also cause damage accumulation and expansion of the structural parts. In most cases, such damage accumulation and expansion are invisible and unexpected, leaving a great potential safety hazard for use of the structural parts, and may even result in serious sudden accidents, causing irreversible losses. Based on the above problems, it is particularly important to perform online health monitoring on the structural parts in their service process.

Constrained by sensors, most of the health monitoring on the structural parts are based on offline nondestructive solutions such as X-ray, ultrasonic, infrared ray. Although a certain degree of active online monitoring can be achieved by externally pasting strain gages, inter-implanting strain lines and the like, but this type of sensors are fragile, corrodible, short in service life, and vulnerable to external force impact, electromagnetic interference. The online health monitoring on the large-scale structural parts needs a temperature and strain monitored sensor element with high sensitivity, good stability, high strength, long service life, aging resistance, anti-interference capability.

The fiber grating, serving as a sensing element sensitive to strain and temperature sensitivity, uses an optical signal as a measurement signal source, and has high electromagnetic interference resistance and high measurement accuracy, and a single optical fiber can realize the online measurement of strain and temperature of dozens of nodes. However, the essence of a fiber grating sensor is a small, brittle glass fiber with an engraved grating, and it is easily broken and inactivated during by external force the process of implanting or externally affixing on the structural part and during normal detection work.

At present, the fiber grating is generally packaged with metal or plastic materials, and the package process is complicated and costly; the metal has high density and is likely to be corroded, and the installation and maintenance are inconvenient. In addition, the compatibility of metal materials with composite materials is poor, and it is easy to form defects when implanted in a large-scale composite material structural part. Therefore, it is of great significance to prolong the service life of the sensor by producing a nonmetallic and lightweight composite material packaged fiber grating sensor with high strength and corrosion resistance. In addition, if the composite material packaged fiber grating sensor can be pasted on the surface and implanted inside the structural part to achieve distributed online measurement of temperature and strain of both the surface and interior of the structural part, it is of great significance for the health monitoring on the structural part.

SUMMARY OF THE INVENTION

In order to solve the above problems, the present invention provides a composite material packaged fiber grating sensor which is suitable for distributed health monitoring on the interior and surface of a structural part, and a manufacturing method of the sensor. In the sensor, strain fiber gratings and temperature fiber gratings are packaged in a composite material structure, thereby not only improving the measurement accuracy of the sensor, but also improving the survival rate of the installed fiber grating sensor. In addition, the composite material package structure has high strength, light weight and corrosion resistance, therefore the service life of the sensor can be greatly prolonged. Moreover, the sensor has good compatibility with a composite material structural part and can be attached to and implanted in the structural part, thereby extending the application range, and being suitable for distributed online measurement of temperature and strain of the interior and the surface of the structural part. The manufacturing method of the composite material packaged fiber grating sensor is simple, efficient and stable, and is suitable for rapid mass production of enterprises.

In order to achieve the above objectives, the present invention adopts the following technical solutions:

The first objective of the present invention is to provide a composite material packaged fiber grating sensor, including: a fiber grating sensor component, a composite material coverage layer, a resin package layer and a composite material substrate layer, wherein the composite material coverage layer and the composite material substrate layer form a shell to wrap the resin package layer;

the fiber grating sensor component includes an optical fiber, one end of the optical fiber is connected with an optical fiber connector, a temperature fiber grating is arranged at the outermost of the other end of the optical fiber, a plurality of strain grating grid regions are engraved in the optical fiber on one end close to the temperature fiber grating, the temperature fiber grating and a strain fiber grating are arranged in series, and the optical fiber is smooth and is not bent, wherein a part of fiber grating sensor component, at least including the temperature fiber grating and the strain grating grid regions, is arranged on the composite material substrate layer and is packaged by the resin package layer therein; and the part of fiber grating sensor component is packaged and protected by the composite material coverage layer and the composite material substrate layer at the same time.

The composite material substrate layer is of a flat plate structure and can be conveniently adhered to the surface of the structural part. The composite material coverage layer is of a streamlined structure; the streamlined shape is an external shape of an object and is usually presented as a smooth and regular surface without large undulations or sharp corners; when the sensor is implanted in the structural part (particularly a composite material structural part), this streamlined structure is conducive to improving the mechanical connection and adhesion strength of the sensor surface and a to-be-measured structural part matrix so as to prevent the separation of the sensor and the to-be-measured structural part matrix. The design of the structure is not only suitable for being adhered on the surface of the measured structural part, but also being suitable for being implanted in the measured structural part, and can achieve the distributed measurement of temperature and strain of the surface and interior of the measured structural part.

Preferably, a protective layer is arranged at the outside of the optical fiber that is not packaged in the resin package layer and the optical fiber that extends to the interior of the resin package layer, and the outer protective layer is likely to be peeled off; and the optical fiber and the protective layer at the outside thereof are single-core cables well known to those skilled in the art.

Preferably, the bottom layer surface of the composite material packaged fiber grating sensor is a plane, and the upper layer surface is a streamlined surface; and the maximum thickness does not exceed 3 mm and the width is (10-40) mm, so that the volume of the sensor is small.

Preferably, the optical fiber is doped with a photosensitive material, and a grating grid region with a set central wavelength is engraved on the optical fiber to serve as the sensing element of the sensor.

Preferably, the temperature grating includes a temperature grating grid region engraved on the optical fiber and a protection pipe sleeved on the temperature grating grid region, and the protection pipe is filled with heat conduction fluid. More preferably, the protection pipe is a rigid heat-resistant capillary pipe.

The rigid heat-resistant capillary pipe has a higher rigidity and strength, and is preferably a stainless steel capillary pipe or a graphite capillary pipe. Further, the sealant of a capillary pipe is preferably a thermosetting epoxy adhesive.

Two or more grating grid regions are engraved on the optical fiber, each grating grid region has a set length, interval and central wavelengths, and the difference of the central wavelengths between the grating grid regions is greater than 3 nm, the protection pipe is sleeved on the grating grid region on the outermost end of the optical fiber, the protection pipe is filled with the heat conduction fluid, and the pipe orifice is sealed with an adhesive, the grating grid region can freely expand and contract within the protection pipe without being affected by external stress or strain to form a temperature grating, and the rest grating grid regions are all strain gratings. The temperature grating is at the outer end of the optical fiber, the strain gratings are inward relative to the temperature grating, only one temperature grating is provided, and one or more strain gratings can be engraved.

The optical fiber connector is installed on the optical fiber at one end of a non-grating grid region, which is mainly convenient for connecting the optical fiber grating sensor component packaged by the composite material with an external system, and omitting the process of welding the optical fiber.

Preferably, the specific manner of arranging the temperature grating and the plurality of strain grating grid regions on the composite material substrate layer is as follows:

the temperature grating and the strain grating grid regions are fixed to the composite material substrate layer in a bonding manner, the optical fiber is kept straight, and certain tensile prestress is applied during the bonding; and preferably, bonding fixing points are respectively at the junction of the optical cable and the naked optical fiber, between the grating grid regions, and at the end parts of the protection pipe.

The temperature measurement of the composite material packaged fiber grating sensor is completed by the temperature grating, the strain measurement is completed by the temperature grating and the strain grating together, and the measurement method is well known to those skilled in the field.

Preferably, the composite material substrate layer includes a fiber fabric structure and the resin layer impregnated and cured in the fiber fabric structure, forming a composite material thin plate of fiber fabric reinforced thermosetting resin, whose thickness is controlled below 1.5 mm; and the composite material substrate layer can be formed by prepreg hot compression molding, liquid molding or vacuum-assisted infusion molding of the fiber fabric. The fiber fabric structure refers to a three-dimensional woven structure made of reinforcing fibers or a two-dimensional planar woven fabric made of reinforcing fibers. The reinforcing fibers are one or more of glass fibers, carbon fibers, basalt fibers, aramid fibers and polyester fibers.

The resin might be epoxy resin, phenolic resin, urethane resin, vinyl resin or other thermosetting resin. The composite material substrate layer of the present invention mainly functions as positioning and loading the fiber gratings and transferring the strain and temperature of the measured structural part to the grating grid regions, this requires that the substrate should have certain rigidity, but the rigidity thereof cannot be too large, otherwise, when the substrate is adhered to the surface of the measured structural part, the fiber grating sensor substrate will act as a reinforcing rib, thus affecting the measurement accuracy; and meanwhile, in order to ensure that the fiber grating sensor can accurately reflect the temperature and strain changes of the measured structural part, the substrate material needs to have minimal strain transfer loss. Therefore, it is necessary to comprehensively consider and select the above-mentioned reinforcing fibers according to the material and the measurement requirements of the to-be-measured structural part, for example, the glass fibers can be selected as the reinforcing fibers of the fiber fabric when a steel structural part or a glass fiber reinforced plastic structural part is measured, and the carbon fibers are selected as the reinforcing fibers of the fiber fabric when the temperature and the strain of a carbon fiber structural part are measured.

More preferably, the composite material substrate layer is manufactured by dense and orthogonal woven glass fiber prepreg with a deployment thickness of (0.2-1.0) mm by hot compression molding.

Further preferably, the composite substrate layer is demoulded by using release cloth, so that approximately frosted rough surfaces are formed on the upper and lower surfaces of the composite material substrate layer; on one hand, the bonding strength of the interface between the composite material substrate layer and the resin package layer is improved, and on the other hand, the bonding strength of the interface between the composite material substrate layer and the measured structural part is improved.

The composite material coverage layer includes a fiber fabric structure and a resin layer impregnated and cured on the fiber fabric structure, the resin layer is obtained by infiltrating and curing the fiber fabric through vacuum-assisted infusion of the resin, and the fiber fabric covers the composite material substrate layer with the fixed fiber grating sensor component. The fiber fabric structure refers to a three-dimensional woven structure made of reinforcing fibers or a two-dimensional planar woven fabric. The reinforcing fibers are one or more of glass fibers, carbon fibers, basalt fibers, aramid fibers and polyester fibers. The resin is epoxy resin, phenolic resin, urethane resin, vinyl resin or other thermosetting resin.

Further, the composite material sensor of the present invention adopts a vacuum-assisted infusion process for the final molding: the fiber fabric is firstly vacuumized before the resin infusing, and the vacuumizing is continuously applied during the resin infusion to maintain the high vacuum degree of the space to be filled, thereby avoiding the generation of bubbles and defects in the composite material coverage layer and the resin package layer, and compared with the conventional casting or resin infusion process, the measurement accuracy and stability of the fiber grating sensor can be greatly improved.

Further preferably, the fiber fabric structure of the composite material coverage layer is electronic-grade orthogonal woven glass fiber cloth (i.e., the electronic cloth).

In the present invention, the composite material substrate layer and the composite material coverage layer can adopt the same resin and can also adopt different resins.

The resin package layer is formed by curing the resin which is filled between the composite material substrate layer and the composite material coverage layer; and the grid regions of the temperature grating and the plurality of strain gratings are completely wrapped in the resin package layer.

The composite material coverage layer and the resin package layer are of an integrated molding structure, which is obtained by the curing process of the resin that is filled in the fiber fabric structure in the composite material coverage layer and the gap between the fiber fabric structure and the composite material substrate layer by vacuum-assisted resin infusion.

The composite material packaged fiber grating sensor of the present invention has both strain and temperature monitoring capabilities. The sensor is of the flat plate structure, lightweight and thin, has high rigidity and toughness, can be conveniently attached to the surface of the measured structural part and can also be implanted in the measured structural part, and its sensitivity is high.

The fiber fabric structure refers to a three-dimensional woven structure or a two-dimensional planar woven structure made of reinforcing fibers, the surface of the fabric is flat, and the composite material coverage layer and the composite material substrate layer have isotropic properties on the plane, thereby avoiding stress concentration due to the anisotropy of the fibers of the traditional unidirectional fiber deployment layer, which causes deactivation of the gratings or causes greater measurement errors. Due to the fiber fabric, the process is simple, the fiber grating can be deployed on any direction without being limited to be necessarily parallel to the fibers, the survival rate of the fiber grating is improved, the measurement accuracy is improved, the stability is good, and the service life is long.

The present invention further provides a manufacturing method of the composite material packaged fiber grating sensor, including the following procedures:

A composite material substrate manufacturing procedure: cutting a fiber fabric or fiber fabric prepreg with a set area, and preparing a composite material substrate by using a molding process;

wherein the fiber fabric prepreg is an uncured fiber fabric formed after the fiber fabric is impregnated with liquid resin, and is a composite system of the uncured resin and the fiber fabric.

A fiber grating sensor component manufacturing procedure: selecting an optical fiber provided with a protective layer on one end, engraving at least two fiber grating grid regions on the optical fiber that is not covered by the protective layer, wherein one fiber grating grid region is located at the tail end of the optical fiber that is not covered by the protective layer, a protection pipe is sleeved on the fiber grating grid region at the tail end, the protection pipe is filled with heat conduction fluid, and the pipe orifice is sealed to form a fiber grating sensor component;

an assembly procedure: fixing the fiber grating sensor component to the obtained composite material substrate or fixing at least two fiber grating sensor components to the prepared composite material substrate in parallel according to a set interval, and then covering the fiber fabric;

a molding procedure: performing vacuum-assisted resin infusion and curing molding on the fiber fabric and the gap between the fiber fabric and the composite material substrate layer to obtain a composite material coverage layer and a resin package layer;

if the number of the fiber grating sensor components in the assembly procedure is greater than or equal to 2, a cutting procedure is performed after the molding procedure, and the cutting is performed parallel to the direction of the fiber grating sensor components; and an optical fiber connector is connected to the tail end of the optical fiber with the protective layer to obtain the composite material packaged fiber grating sensor.

In the composite material substrate manufacturing procedure, the fiber fabric is a woven fabric having a set thickness and strength and produced by reinforcing fibers through a weaving process (two-dimensional weaving or three-dimensional weaving and other processes).

The molding procedure of the composite material substrate layer can be a process such as prepreg hot compression molding, liquid molding or vacuum-assisted infusion molding or the like.

The composite material substrate layer obtained by the composite material substrate manufacturing procedure is a thin composite material flat plate.

In the fiber grating sensor component manufacturing procedure, the manufacturing method of the optical fiber provided with a protective layer on one end is further as follows: cutting a set length of an optical cable that is wrapped with an outer protective layer and is doped with a photosensitive material, and stripping a set length of the outer protective layer at one end thereof.

Each grating grid region has a different central wavelength, the grating grid region have set lengths and intervals.

In the assembly procedure, the fixing mode is bonding; and the bonding fixing points are respectively at the junction of the optical fiber with the protective layer and the optical fiber without the protective layer, between the grating grid regions, and at the end parts of the protection pipe.

In the cutting procedure, during the cutting, the fiber grating sensor component is located on the centerline of the cut strip-shaped composite material.

One of the above technical solutions has the following beneficial effects:

(1) The present invention designs a composite material packaged fiber grating sensor having both strain and temperature detection functions, the sensor has high strength, good toughness, light weight, corrosion resistance and good compatibility with the composite material, the survival rate and the measurement accuracy of the installed fiber grating sensor are improved, the application range is extended, and the fiber grating sensor can be directly applied to the online health monitoring on the measured structural part. The overall structure of the sensor is a laminated composite structure that can be attached to the surface of the structural part or implanted in the structural part.

(2) In the present invention, sensitive components with sensing functions are completely implanted in a composite material shell, fully enveloped by the resin of the resin package layer, the debonding phenomenon of the fiber grating, the composite material substrate layer and the composite material coverage layer does not occur in a complicated working environment, the test result has higher accuracy and stability, and the composite material packaged fiber grating sensor can be applied to harsh environment monitoring.

(3) In the present invention, the strain fiber grating and the temperature fiber grating are serially arranged on the same optical fiber, this design is more conducive to the transmission of optical signals, and the prepared composite material packaged fiber grating sensor has both strain and temperature monitoring capabilities, and the sensor has small size, light weight, high rigidity and toughness and high sensitivity.

(4) The present invention further provides the manufacturing method of the composite material packaged fiber grating sensor, the method is easy to operate and high in efficiency, a plurality of identical fiber grating sensors can be simultaneously manufactured in one manufacturing cycle, and thus the method is suitable for rapid mass production of enterprises.

(5) In the manufacturing method of the composite material packaged fiber grating sensor of the present invention, a twice curing process is adopted, the composite material substrate layer is molded in the first molding, the molding process can be prepreg hot compression molding, liquid molding or vacuum-assisted infusion molding, and a composite material thin-layer flat plate with a thickness of less than 1.5 mm is formed; the secondary molding is vacuum-assisted infusion molding and is used for accomplishing a package process of the sensor, and the twice curing process significantly improves the strength of interlayer interfaces, thereby increasing the test accuracy and stability of the fiber grating sensor.

(6) The present invention adopts the three-dimensional woven or two-dimensional woven fiber fabric as a reinforcing material, and the properties of the three-dimensional woven or two-dimensional woven fiber fabric are isotropic on all directions in the plane, thereby avoiding stress concentration due to the anisotropy of the fibers and the resultant deactivation of the gratings or greater measurement errors. Due to the fiber fabric, the fiber grating can be deployed on any direction without being limited to the fact that the optical fiber must be parallel to the reinforcing fibers of the to-be monitored structures, the manufacturing process is simplified, the cost is reduced, and the survival rate, the measurement accuracy, the stability and the service life of the fiber grating sensor are improved.

Figure 1:
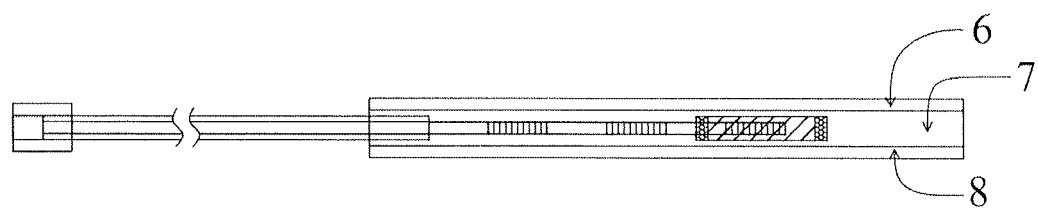
FIG. 1 is a schematic diagram of a front structure of a composite material packaged fiber grating sensor.

In which: 1 optical cable, 2 strain grating, 3 temperature grating, 4 rigid heat-resistant capillary pipe, 5 optical fiber connector, 6 composite material coverage layer, 7 resin package layer, 8 composite material substrate layer, 9 capillary pipe orifice sealant, 10 bonding fixing point, 11 optical fiber, and 12 outer protective layer.

DETAILED DESCRIPTION OF THE EMBODIMENTS

The present invention will be further described with reference to the following embodiments.

The terms of the present invention are explained as follows:

Optical fiber is short for optical waveguide fiber, it is a fiber made of glass or plastic and can be used as a light transmission tool. It is brittle and easy to break, thus requiring a protective layer at the outside.

An optical cable is composed of an optical waveguide fiber and a protective sleeve, and the protective structure on the outer layer can prevent the surrounding environment from damaging the optical fiber. A single-core optical cable is an optical cable containing one optical fiber.

Prepreg is an uncured fiber fabric formed after the fiber fabric is impregnated with liquid resin, and is a composite system of the uncured resin and the fiber fabric.

Prepreg hot compression molding is a molding process. The basic process is that a certain amount of molding material subjected to a resin preimpregnation treatment is placed in a preheated mold, and a higher pressure is applied to fill the mold cavity with the molding material. The molding material is gradually cured under a certain pressure and temperature, and then a product is taken out of the mold, and other auxiliary processing is performed according to actual conditions to obtain the product.

Liquid molding refers to a preparation technique of injecting a liquid polymer into a closed mold cavity deployed with a fiber perform, or heating and melting a resin film previously placed in the mold cavity, completing the infiltration of resin/fiber by the liquid polymer while filling the mold by flowing, and performing curing molding to prepare the product.

Vacuum-assisted resin infusion molding is a novel composite material product molding process having high performance and low cost and not using autoclave molding, it refers to removing air from fiber reinforcement in a vacuum state and realizing the impregnation and curing of the fiber preform through the flow and penetration of the resin through a pre-designed flow channel.

In the present invention, "a plurality of" or "multiple layers" means that the number includes one/one layer, two/two layers or more.

The present invention is further explained and described as follows:

A composite material packaged fiber grating sensor includes a fiber grating sensor component, a composite material coverage layer 6, a resin package layer 7 and a composite material substrate layer 8. The fiber grating sensor component includes an optical cable 1, a strain grating 2, a temperature grating 3, a rigid heat-resistant capillary pipe 4 and an optical fiber connector 5. The strain grating 2, the temperature grating 3, the hard heat-resistant capillary pipe 4 and a part of the optical cable are packaged in the resin package layer 7, and the composite material coverage layer 6 and the composite material substrate layer 8 perform safety protection on the resin package layer 7 and the fiber grating sensor component.

The optical cable 1 is composed of an optical fiber 11 and an outer protective layer 12, a set length of the outer protective layer is stripped from one end of the optical cable 1 to form a naked optical fiber, and two or more grating grid regions are engraved on the naked optical fiber, and one grating grid region is located at the tail end of the naked optical fiber; and the other end of the optical cable is connected with the optical fiber connector 5. The rigid heat-resistant capillary pipe 4 is sleeved at the outside of a grating grid region at the tail end of the naked optical fiber, the rigid heat-resistant capillary pipe 4 is filled with heat conduction fluid and is sealed to form the temperature grating 3; and the strain gratings 2 are in the rest grating grid regions.

Figure 3:
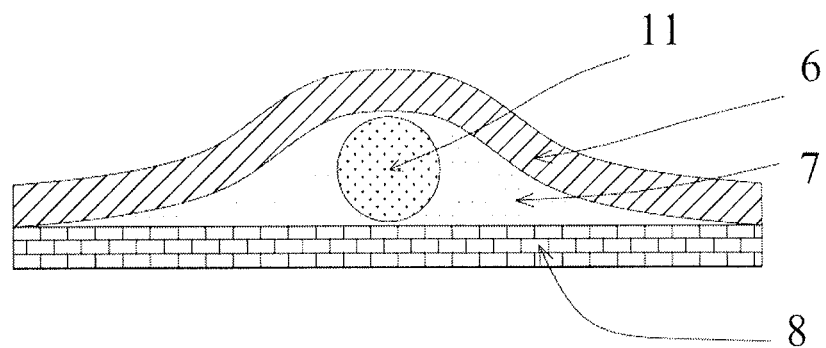
FIG. 3 is a schematic diagram of a cross section of a composite material packaged fiber grating sensor.

The composite material packaged fiber grating sensor is of a three-layer structure including an upper layer, a middle layer and a lower layer, the upper layer is the composite material coverage layer 6, the middle layer is the resin package layer 7, and the lower layer is the composite material substrate layer 8, wherein the bottom surface of the composite material substrate layer 8 is of a flat plate structure and can be conveniently adhered to the surface of the structural part. The optical fiber 11, the strain grating 2, the temperature grating 3, the rigid heat-resistant capillary pipe 4 and a part of optical cable are packaged in the resin package layer 7 at the middle. The sensor is of a thin plate structure (as shown in FIG. 3) in which the bottom layer is of a planar structure and the upper layer is a streamlined surface, and the maximum thickness does not exceed 3 mm.

The composite material substrate layer 8 is a composite thin plate made of a thermosetting resin cured fiber fabric, of which the thickness is controlled to be 1.5 mm or less, the composite material substrate can be manufactured by a process such as prepreg hot compression molding, liquid molding or vacuum-assisted infusion molding of the fiber fabric, and is preferably manufactured by dense and orthogonal woven glass fiber prepreg with a deployment thickness of (0.2-1.0) mm by hot compression molding. Further preferably, the composite substrate layer is demolded by using release cloth.

The composite material coverage layer 6 is prepared by one or more layers of fiber fabrics, which are impregnated and cured by vacuum-assisted resin infusion and cover the composite material substrate layer 8 with the fixed fiber grating sensor component. The fiber fabric is preferably is electronic-grade orthogonal woven glass fiber cloth.

The resin package layer 7 is formed by the curing of the resin filled between the composite material substrate layer 8 and the composite material coverage layer 6, and the fiber grating sensor component is completely wrapped in the resin package layer 7.

Further, the fabric fibers used by the composite material substrate layer 8 and the composite material coverage layer 6 can be glass fibers, carbon fibers, basalt fibers, aramid fibers, polyester fibers or blended fibers, and the thermosetting resin used by the composite material packaged fiber grating sensor can be epoxy resin, phenolic resin, polyurethane resin, unsaturated polyester or vinyl resin or the like. Furthermore, the composite material substrate layer 8 and the composite material coverage layer 6 can adopt the same resin and can also adopt different resins.

The function of the three-layer composite material structure is to package and protect the strain gratings and the temperature grating, and the length of the three-layer composite material structure is greater than the length of the naked optical fiber with the outer protective layer stripped.

The optical cable 1 is a single-core optical cable, which is composed of an optical fiber 11 doped with a photosensitive material and an outer protective layer 12, and the protective layer is easily peeled off, and a grating grid region with a set central wavelength can be engraved in the optical fiber 11 to serve as a sensor element.

After the outer protective layer is peeled off from the tail end of the optical cable 1, a naked optical fiber is formed, two or more grating grid regions are engraved on the optical fiber, the grating grid regions have set lengths and intervals, the distance between the central wavelengths of the grating grid regions is greater than 3 nm, the rigid heat-resistant capillary pipe 4 is sleeved at the outside of the grating grid region at the outermost end, the rigid heat-resistant capillary pipe is filled with heat conduction fluid, and the pipe orifice is sealed to form the temperature grating 3, and the strain gratings 2 are in the rest grating grid regions. The temperature grating 3 is at the outer end of the optical fiber, the strain gratings 2 are inward relative to the temperature grating, only one temperature grating 3 is provided, and one or more strain gratings 2 can be engraved.

Further, the fiber grating sensor component can be manufactured by engraving a grating string in the optical cable, or can be manufactured by fusing a purchased commodity optical fiber grating string and a transmission optical fiber.

The rigid heat-resistant capillary pipe 4 has a higher rigidity and strength, and is preferably a stainless steel capillary pipe or a graphite capillary pipe. Further, the material of a capillary pipe sealant 9 is preferably a thermosetting epoxy adhesive.

The other end of the optical fiber connector 5 installed at the non-grating grid region of the optical cable is connected with the optical fiber in the optical cable.

Figure 2:
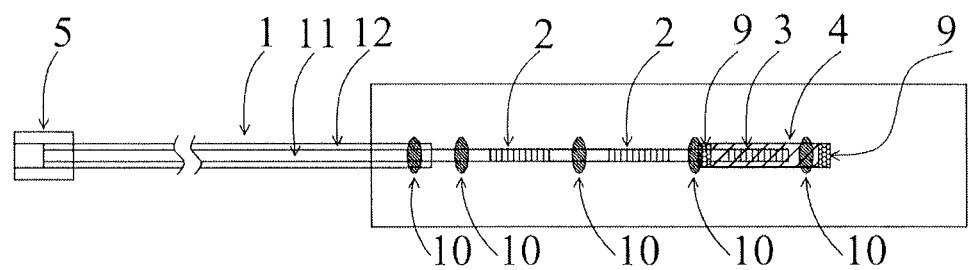
FIG. 2 is a schematic diagram of an overlooking structure of a composite material packaged fiber grating sensor.

The fiber grating sensor component is fixed to the composite material substrate layer 8 in a bonding manner as shown in FIG. 1 and FIG. 2, and preferably, bonding fixing points 10 are respectively at the junction of the optical cable 1 and the naked optical fiber, between the grating grid regions, and at the end parts of the rigid heat-resistant capillary pipe 4.

Figure 6:
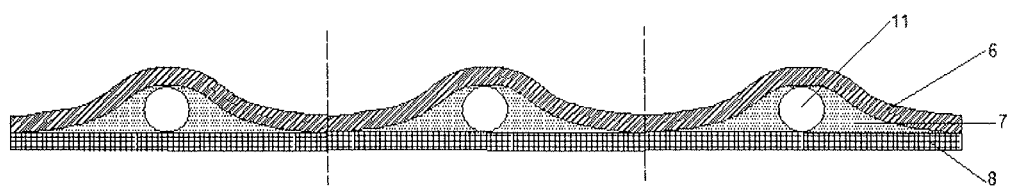
FIG. 6 is a structural schematic diagram of packaging a plurality of fiber grating sensor components.

The present invention provides a manufacturing method of the composite material packaged fiber grating sensor, including the following specific steps:

1. cutting a fiber fabric or fiber fabric prepreg with a set area, and performing high temperature and high pressure impregnation and curing to prepare a composite material thin flat plate containing one or multiple layers of fiber fabrics to serve as a composite material substrate of the sensor;

2. cutting a set length of optical cable wrapped with an outer protective layer and doped with a photosensitive material, stripping a set length of outer protective layer from one end of the optical cable, engraving a plurality of fiber grating grid regions on the naked optical fiber, wherein each grating has a different central wavelength, the grating grid regions have set lengths and intervals, sleeving a rigid heat-resistant capillary pipe on the fiber grating grid region at the outermost end, filling the capillary pipe with heat conduction fluid, and sealing the pipe orifice to form a fiber grating sensor component;

3. placing a plurality of fiber grating sensor components obtained in step 2 to the composite material substrate obtained in step 1 in parallel according to set intervals, wherein it is required that the fiber grating sensor components and a part of optical cable are located on the composite material substrate obtained in step 1 as shown in FIG. 6;

4. bonding and fixing the fiber grating sensor components in step 3 to the composite material substrate, so that the optical fiber is straight and bears certain prestress, wherein bonding fixing points are respectively at the junction of the optical cable and the naked optical fiber, between the grating grid regions, and at the end parts of the rigid heat-resistant capillary pipe;

5. covering multiple layers of fiber fabrics having the same size as the composite material substrate layer on the substrate with the fixed fiber grating sensor components obtained in step 4, and performing vacuum-assisted resin infusion and curing molding;

6. cutting the composite material packaged fiber grating sensor blank obtained in step 5 at equal intervals according to the parallel placement intervals of the fiber grating sensor components in step 3 on a direction parallel to the fiber grating sensor components (as shown in FIG. 6), and locating the fiber grating sensor components on the centerline of the cut strip-shaped composite material; and 7. mounting the optical fiber connector on the optical cable of the cut-off fiber grating sensor to manufacture a plurality of composite material packaged fiber grating sensors having online temperature and strain monitoring functions at one time.

Embodiment 1: A Glass Fiber Composite Material Packaged Fiber Grating Sensor

A glass fiber composite material packaged fiber grating sensor includes a glass fiber coverage layer, an epoxy resin package layer, a glass fiber substrate layer, an optical cable, a temperature grating, strain gratings, a stainless steel capillary pipe and an optical fiber connector. The epoxy resin package layer is located between the glass fiber coverage layer and the glass fiber substrate layer. Three grating grid regions with different central wavelengths are engraved on a naked optical fiber end of the optical cable to respectively serve as one temperature grating and two strain gratings, which are implanted in the epoxy resin package layer of a glass fiber composite material structure, and the other end of the optical cable is connected with the optical fiber connector.

The manufacturing method of a glass fiber composite material packaged fiber grating sensor is as follows:

1. cutting 3 pieces of 150 mm×500 mm glass fiber orthogonal woven cloth with surface density of 400 g/m², selecting one piece of glass fiber orthogonal woven cloth, impregnating epoxy resin through a vacuum-assisted resin infusion process, and performing curing to obtain a layer of glass fiber composite material thin flat plate to serve as a glass fiber composite material substrate;

2. cutting a 600 mm optical cable, stripping 90 mm outer protective layer from one end of the optical cable, engraving 3 fiber grating grid regions on the naked optical fiber with central wavelengths of 1532 nm, 1542 nm and 1552 nm, with the lengths of the grid regions being 10 mm and the intervals being 10 mm, sleeving the stainless steel capillary pipe on the fiber grating grid region at the outermost end, filling the stainless steel capillary pipe with heat conduction fluid, and sealing the pipe orifice with epoxy glue to form a fiber grating sensor component;

3. placing 20 fiber grating sensor components obtained in step 2 to the glass fiber composite material substrate obtained in step 1 in parallel according to intervals of 25 mm, wherein it is required that the naked optical fibers, the grating grid regions, the stainless steel capillary pipes in the fiber grating sensor components and a part of optical cable are located on the composite material substrate obtained in step 1;

4. bonding and fixing the fiber grating sensor components in step 3 to the composite material substrate obtained in step 1, so that the optical fiber is straight and bears certain prestress, wherein bonding fixing points are respectively at the junction of the optical cable and the naked optical fiber, between the grating grid regions, and at the end parts of the stainless steel capillary pipe;

5. covering 2 layers of electronic-grade orthogonal woven glass fiber fabrics on the composite material substrate with the fixed fiber grating sensor components obtained in step 4, and performing vacuum-assisted resin infusion and curing molding;

6. cutting the composite material packaged fiber grating sensor blank obtained in step 5 at equal intervals of 25 mm on a direction parallel to the fiber grating sensor components, wherein it should be guaranteed that the fiber grating sensor components are located on the centerline of the cut strip-shaped composite material packaged fiber grating sensor during the cutting; and 7. mounting the optical fiber connector on the optical cable of the cut-off fiber grating sensor in step 6 to manufacture 20 glass fiber composite material packaged fiber grating sensors having online monitoring functions of strain and temperature at one time, wherein the glass fiber composite material packaged fiber grating sensors can be applied to health monitoring on structural parts.

Figure 4:
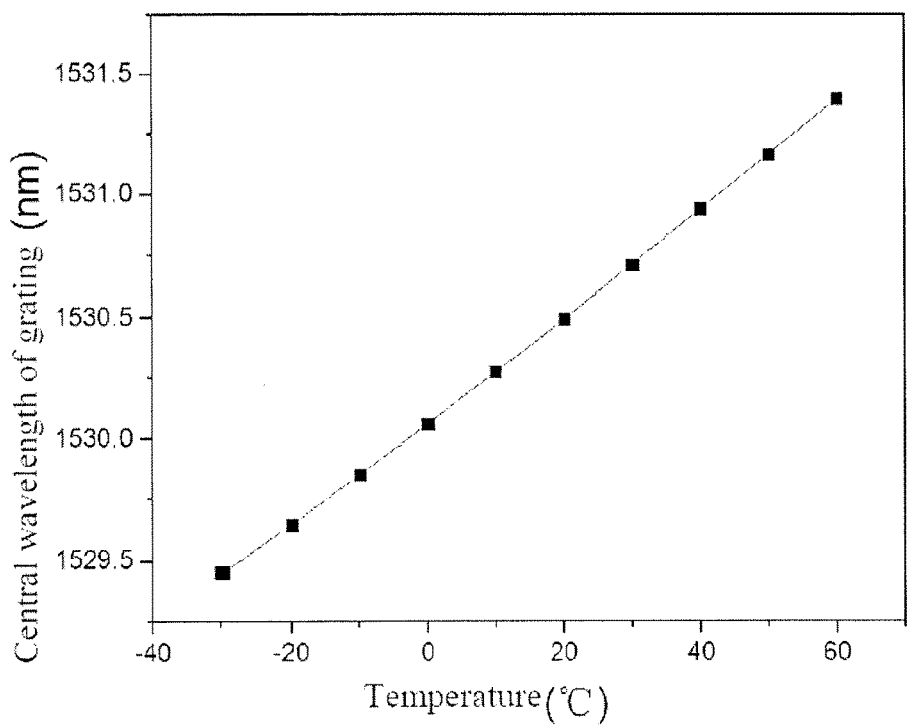
FIG. 4 is a central wavelength-temperature relationship curve of an actual test of a fiber grating sensor.
Figure 5:
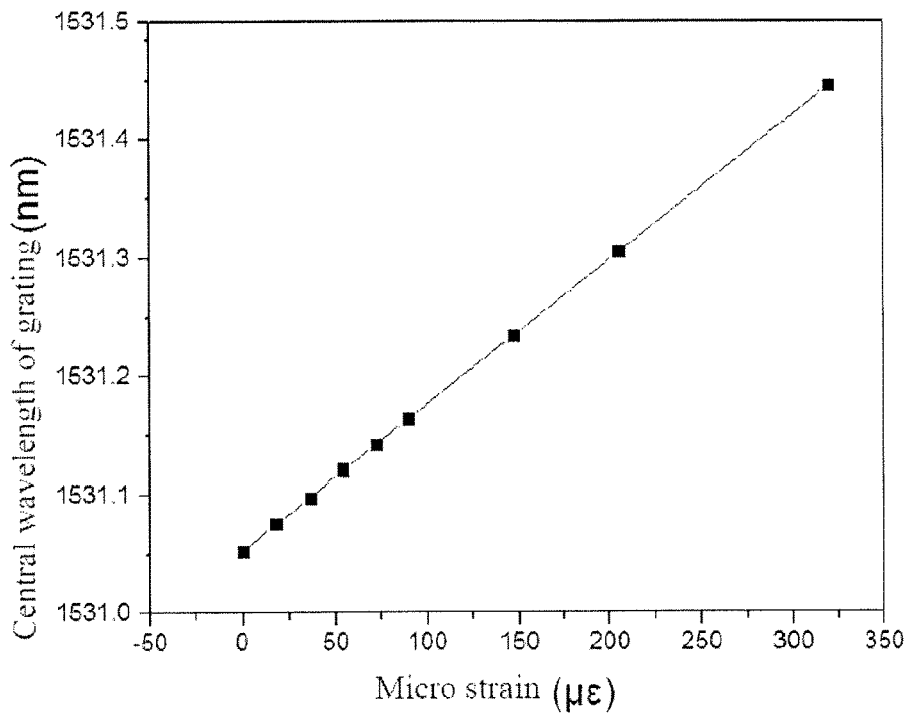
FIG. 5 is a central wavelength-strain relationship curve of an actual test of a fiber grating sensor.

By adoption of the glass fiber composite material packaged fiber grating sensor manufactured according to the present embodiment, the changes of central wavelengths in a temperature rise process from −30° C. to 60° C. are actually measured, as shown in FIG. 4, and the changes of central wavelengths under different strains are measured by an equal-strength beam method, as shown in FIG. 5. The temperature measurement and the strain measurement are equal to measurement values of precise thermometers and strain gauges, and high measurement accuracy is shown.

Embodiment 2: A Carbon Fiber Composite Material Packaged Fiber Grating Sensor

A carbon fiber composite material packaged fiber grating sensor includes a carbon fiber coverage layer, an epoxy resin package layer, a carbon fiber substrate layer, an optical cable, a temperature grating, a strain grating, an aluminum alloy capillary pipe and an optical fiber connector. Two grating grid regions with different central wavelengths are engraved on a naked optical fiber end of the optical cable to respectively serve as a temperature grating and a strain grating, which are implanted in the epoxy resin package layer composed of the carbon fiber composite material coverage layer and the substrate layer, and the other end of the optical cable is connected with the optical fiber connector.

The manufacturing method of a carbon fiber composite material packaged fiber grating sensor is as follows:

1. cutting a piece of 130 mm×500 mm carbon fiber woven prepreg and 2 pieces of 130 mm×500 mm carbon fiber woven cloth, selecting one piece of carbon fiber woven prepreg, curing the same through a hot pressing process to obtain a carbon fiber composite material thin flat plate to serve as a carbon fiber composite material substrate;

2. cutting a 500 mm optical cable, stripping 80 mm outer protective layer from one end of the optical cable, engraving 2 fiber grating grid regions on the naked optical fiber with central wavelengths of 1536 nm and 1542 nm, with the lengths of the grid regions being 10 mm and the intervals being 10 mm, sleeving the aluminum alloy capillary pipe on the fiber grating grid region at the outermost end, and sealing the pipe orifice and the gap between the optical fiber and the pipe orifice with epoxy glue to form a fiber grating sensor component;

3. placing 25 fiber grating sensor components obtained in step 2 on the composite material substrate obtained in step 1 in parallel according to intervals of 20 mm;

4. bonding and fixing the fiber grating sensor components in step 3 to the carbon fiber composite material substrate obtained in step 1, so that the optical fiber is straight and bears certain prestress, wherein bonding fixing points are respectively at the junction of the optical cable and the optical fiber, between the grating grid regions, and the end parts of the aluminum alloy capillary pipe;

5. covering 2 layers of carbon fiber woven fabrics on the substrate with the fixed fiber grating sensor components obtained in step 4, and then performing vacuum-assisted resin infusion and curing molding;

6. cutting the composite material packaged fiber grating sensor blank obtained in step 5 at equal intervals of 20 mm on a direction parallel to the fiber grating sensor components, wherein it should be guaranteed that the fiber grating sensor components are located on the centerline of the cut strip-shaped composite material packaged fiber grating sensor during the cutting; and 7. mounting the optical fiber connector on the optical cable of the cut-off fiber grating sensor to manufacture 25 glass fiber composite material packaged fiber grating sensors having online monitoring functions of strain and temperature at one time.

The above embodiments are preferred embodiments of the present invention, but the embodiments of the present invention are not limited to the foregoing embodiments, and any changes, modifications, substitutions, combinations and simplifications made without departing from the spirit and principle of the present invention should be equivalent replacement modes and shall all fall within the protection scope of the present invention.

The invention claimed is:

1. A composite material packaged fiber grating sensor, comprising:
   a fiber grating sensor component,
   a composite material coverage layer,
   a resin package layer, and
   a composite material substrate layer,
   wherein:
   the composite material coverage layer and the composite material substrate layer form a shell that wraps the resin package layer,
   the fiber grating sensor component comprises an optical fiber, strain grating regions, and a temperature fiber grating including grid regions, where:
      one end of the optical fiber is connected to an optical fiber connector,
      the temperature fiber grating is arranged at the outermost region of the other end of the optical fiber,
      the strain grating grid regions are engraved in the end of the optical fiber that is closer to the temperature fiber grating,
      the temperature fiber grating and the strain grating grid regions are arranged in series,
      the optical fiber is straight without any bends,
      a part of the fiber grating sensor component, which includes at least the temperature fiber grating and the strain grating grid regions, is arranged on the composite material substrate layer and packaged by the resin package layer that is formed by curing resin that filled a region between the composite material substrate layer and the composite material coverage layer, and
      the temperature fiber grating grid regions and the strain grating grid regions are completely packaged in the resin package layer,
   the composite material coverage layer and the resin package layer form an integrated molding structure obtained by curing resin that filled a fiber fabric structure in the composite material coverage layer and a gap between the fiber fabric structure and the composite material substrate layer by vacuum-assisted resin infusion,
   the composite material substrate layer has a flat plate structure,
   the composite material coverage layer has a streamlined structure,
   a protective layer is arranged at the outside of the optical fiber that is not packaged in the resin package layer and at a part of the optical fiber that extends to the interior of the resin package layer,
   the composite material substrate layer comprises a first fiber fabric structure, and a resin layer that is impregnated and cured on the first fiber fabric structure, where the first fiber fabric structure refers to a three-dimensional woven structure made of reinforcing fibers or a two-dimensional planar woven fabric made of reinforcing fibers, and
   the composite material coverage layer comprises a second fiber fabric structure, and a resin layer impregnated and cured on the second fiber fabric structure, where:
      the resin layer is obtained by vacuum-assisted infusion of the resin and curing the fiber fabric, and
      the second fiber fabric structure refers to a three-dimensional woven structure made of reinforcing fibers or a two-dimensional planar woven fabric made of reinforcing fibers.

2. The fiber grating sensor according to claim 1, wherein the thickness of the composite material substrate layer is less than 1.5 mm.

3. The fiber grating sensor according to claim 1, wherein the composite material substrate layer is formed molding the fiber fabric using prepreg hot compression molding, liquid resin transfer molding, or vacuum-assisted infusion molding.

4. The fiber grating sensor according to claim 1, wherein the reinforcing fibers are at least one type of fiber selected from the group consisting of glass fibers, carbon fibers, basalt fibers, aramid fibers, and polyester fibers.

5. The fiber grating sensor according to claim 1, wherein the resin is an epoxy resin, a phenolic resin, an urethane resin, or a vinyl resin.

6. The fiber grating sensor according to claim 1, wherein the composite material substrate layer is manufactured by hot compression molding dense and orthogonal woven glass fiber prepreg with a deployment thickness of 0.2-1.0 mm.

7. The fiber grating sensor according to claim 1, wherein the composite substrate layer is demoulded by using a release cloth so that frosted rough surfaces are formed on the upper and lower surfaces of the composite material substrate layer.

8. The fiber grating sensor according to claim 1, wherein the second fiber fabric structure in the composite material coverage layer is an electronic-grade orthogonal woven glass fiber cloth.

9. A manufacturing method of a composite material packaged fiber grating sensor, comprising the following procedures:
- a composite material substrate manufacturing procedure including cutting a fiber fabric or fiber fabric prepreg with a set area, and preparing a composite material substrate by a molding process;
- a fiber grating sensor component manufacturing procedure including selecting an optical fiber provided with a protective layer on one end, engraving at least two fiber grating grid regions on the other end of the optical fiber without the protective layer, wherein one fiber grating grid region is located at the tail end of the optical fiber that is not covered by the protective layer, a protection pipe is sleeved on the fiber grating grid region at the tail end, then the protection pipe is filled with heat conduction fluid, and the pipe orifice is sealed to form a fiber grating sensing component;
- an assembly procedure including fixing one of the fiber grating sensor component to the prepared composite material substrate or fixing at least two fiber grating sensor components to the prepared composite material substrate in parallel according to a set interval, and then covering the fiber fabric;
- a molding procedure including performing vacuum-assisted resin infusion and curing molding on the covered fiber fabric and the gap between the fiber fabric and the composite material substrate layer to obtain a composite material coverage layer and a resin package layer;
- wherein if the number of the fiber grating sensor components in the assembly procedure is greater than or equal to 2, a cutting procedure is performed after the molding procedure, and the cutting is performed parallel to the direction of the fiber grating sensor components; and
- an optical fiber connector is connected to the tail end of the optical fiber with the protective layer so as to obtain the composite material packaged fiber grating sensor.

10. The manufacturing method according to claim 9, wherein in the composite material substrate manufacturing procedure, the molding process can be a prepreg hot molding process, a liquid resin transfer molding process, or a vacuum-assisted infusion molding process.

11. The manufacturing method according to claim 9, wherein in the fiber grating sensor component manufacturing procedure, the manufacturing method of the optical fiber provided with a protective layer on one end is further as follows: cutting a set length of an optical cable that is wrapped with an outer protective layer and is doped with a photosensitive material, and then stripping a set length of the outer protective layer at one end thereof.

12. The manufacturing method according to claim 9, wherein in the assembly procedure, the fixing mode is bonding; and the bonding fixing points are respectively at the junction of the optical fiber with the protective layer and the optical fiber without the protective layer, between the grating grid regions, and at the end parts of the protection pipe.

13. The manufacturing method according to claim 9, wherein in the cutting procedure, during the cutting, the fiber grating sensor component is located on the centerline of the cut strip-shaped composite material.

14. The manufacturing method according to claim 9, wherein each grating grid region has a different central wavelength, and the grating grid regions have set lengths and intervals.

15. The manufacturing method according to claim 10, wherein the composite material substrate layer prepared by the composite material substrate manufacturing procedure is a thin composite material flat plate.

* * * * *